United States Patent [19]
Gouault et al.

[11] 3,808,066
[45] Apr. 30, 1974

[54] METHOD OF MANUFACTURING COMPOSITE STRUCTURES

[75] Inventors: Andre Gouault, Villa Clair Matin; Gerard Barkats, Aime Martin-Nice, both of France

[73] Assignee: Societe Nationale Industrielle Aerospatiale, Paris, (Seine), France

[22] Filed: Jan. 19, 1972

[21] Appl. No.: 218,863

[30] Foreign Application Priority Data
Jan. 22, 1971  France .................................. 71.02076

[52] U.S. Cl. .................. 156/3, 156/6, 156/155, 156/205, 156/210, 156/247, 156/278, 117/6, 117/8, 117/107
[51] Int. Cl. ........ B32b 31/14, B31f 1/22, B44c 1/22
[58] Field of Search ........... 156/205, 210, 155, 128, 156/249, 278, 305, 344, 247, 150, 3, 6; 117/6, 8, 107; 264/317

[56] References Cited
UNITED STATES PATENTS

| | | | |
|---|---|---|---|
| 3,325,319 | 6/1967 | Frantzen | 156/6 |
| 3,666,578 | 5/1972 | Chadsey, Jr. et al. | 117/107 |
| 3,480,708 | 11/1969 | St. Clair | 264/317 |
| 3,112,184 | 11/1963 | Hollenbach | 264/317 |
| 2,464,157 | 3/1949 | Scheer et al. | 117/107 |
| 2,193,496 | 3/1940 | Schwartz et al. | 156/247 |
| 3,002,873 | 10/1961 | Pickren | 156/205 |
| 3,666,590 | 5/1972 | Susuki et al. | 156/210 |
| 3,562,083 | 2/1971 | Schroder | 156/210 X |

*Primary Examiner*—Alfred L. Leavitt
*Assistant Examiner*—Basil J. Lewris
*Attorney, Agent, or Firm*—McGlew and Tuttle

[57] ABSTRACT

The invention relates to a method of manufacturing composite structures, characterized by the fact that one of the elements of a structure of this kind is temporarily rigidified to allow it to be shaped and retained in that shape by an associated rgidifying substance prior to being joined to another sheet, after which the rigidifying substance is eliminated.

6 Claims, 4 Drawing Figures

METHOD OF MANUFACTURING COMPOSITE STRUCTURES

SPECIFICATION

The technical province of this invention is the manufacture of objects made of plastics.

The invention relates to the obtainment of composite structures, one of the elements of which is corrugated.

As a rule, such a corrugated element is glued to a flat sheet, and a composite structure obtained in this way will possess great flexibility in the direction perpendicular to the corrugation and great rigidity in the direction parallel thereto.

It becomes difficult to manufacture such structures when the material used for the corrugated portion at least is elastic and cannot be held to the shape of the corrugations.

In the case of certain sheet materials, the corrugated shape may be obtained in an ultimate phase of the process of manufacture.

On the other hand, manufacture on this basis would be too restricted in diversification to overcome the practical problems of utilization - which calls for a wide diversity of shapes - and would consequently be an obstacle not only to the marketing of a monotype corrugated structural material but also to the efficient manufacture of finished products.

It is therefore preferable in the case of such corrugated composites to be able to stock a raw material in sheet form and corrugate it as required in each individual case.

It is the object of the present invention to allow such corrugated elements to be tailored to individual needs, and the invention accordingly relates to a method of manufacturing composite structures comprising a corrugated element, characterized by the fact that a flat sheet forming said corrugated element is temporarily rigidified by an associated coating of rigid or rigidifiable substance, the combination of said element and coating then undergoing a permanent shaping and the corrugated sheet having its uncoated side thereafter joined to a flat sheet, following which the rigidifying substance is eliminated.

Such a method can be applied with advantage to a composite sheet that includes such materials as polyimides, and more particularly the polyimide known by the trade-name "Kapton." Materials of this kind are elastic and non-thermoformable and will not on their own retain a shape imparted to them subsequent to manufacture.

In one specific mode of application of the subject method of this invention, a flat sheet of "Kapton" has deposited on to one of its sides a rigidifying metallic coating, and more particularly a coating of copper, silver or aluminum, and this compound sheet is then corrugated by being run through a rolling-mill having fluted rolls, for example. The corrugated element then has the apices of its non-metallized side bonded to a complementary element, and more specifically to a likewise non-metallized side of another flat sheet of "Kapton," following which the metallization is eliminated by chemical means, for example.

Starting simply with flat sheets, it is thus possible to obtain a wide diversity of wavy profiles, or even more complex shapes.

The possible range of industrial applications of this invention is a very wide one and includes the improved manufacture of flexible supports for photosensitive electronic devices, for instance.

The description which follows with reference to the accompanying non-limitative exemplary drawing, showing the process of manufacture of such a composite structure, will give a clear understanding of how the invention can be carried into practice.

Figure 1:
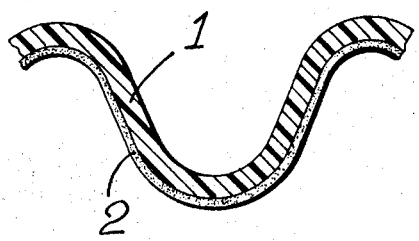
FIG. 1 is a partial sectional view of an enlarged scale of a metallized sheet of "Kapton" having undergone a corrugating operation.
Figure 2:
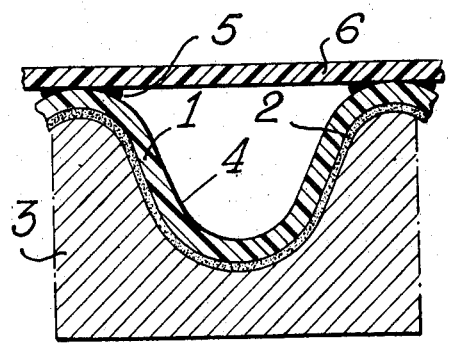
FIG. 2 shows this sheet bonded to another flat sheet prior to elimination of the metallized coating.
Figure 3:
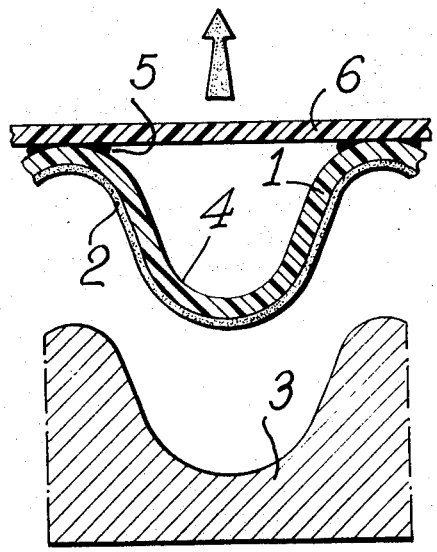
FIG. 3 illustrates the phase of extracting the composite structure from the bonding die.

Starting with a flat sheet of polyimide 1, the same has deposited thereon, by vacuum spraying or otherwise, a coating 2 of a metal such as copper for example, and the metallized sheet is then corrugated by being run through a rolling-mill with fluted rolls.

The sheet of polyimide is a few hundredths of a millimetre thick and the metallization thereon is a few microns thick. The corrugations on this compound have a pitch and depth of the order of 2 to 3 millimetres. The degree of rigidity of the metallic coating is sufficient to hold the permanent deformation imparted to the compound-something the polyimide sheet alone would be incapable of doing.

This corrugated product is placed in a restraining die or mould 3 of matching shape, with its non-metallized face 4 turned outwards so that it may receive a flat sheet 6 of the same material against bonding areas 5 on the corrugation apices.

The composite structure thereby obtained is removed from the die 3 and rid of the metallic film by chemical attack (using ferric chloride $FeCl_3,6H_2O$ in the case of a coppered sheet) so as to leave only the sheets and the composite structure 7 formed therefrom (the ferric chloride being inert in respect of the sheets themselves).

Figure 4:
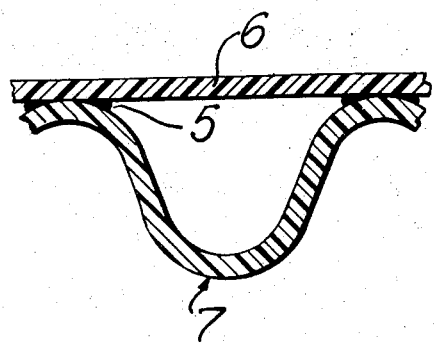
FIG. 4 shows the finished composite structure after removal of the metallization.

It goes without saying that many variants may be introduced into the subject method of this invention. For instance, the elements of the composite structure could be welded together; moreover, any other convenient way of rigidifying the sheet 1 to be corrugated could be resorted to, notably by associating to it any sufficiently rigid material capable of assuming a permanent set and of remaining rigid after being shaped. Alternatively, the sheet 1 could have associated thereto some other substance retained thereon by adhesion. Equally, any other convenient method of removing the rigidifying material could be used, most notably by dissolution or by physical separation. Subsequent to removal of the metallic coating, the sheet 7 assumes a natural curved shape, as shown in FIG. 4.

Products obtained as above-disclosed can assume a variety of shapes, as required, for a board range of applications, and this with great precision in respect of configuration. Notwithstanding the great possible variety of such products, the performance of the subject method of this invention remains very economical since both the dimensions and the cost of the rolls needed for rolling the component parts of the composite structure to be obtained are incomparably less than those of the rolling-mills used in the terminal phase of fabrication of large "Kapton" sheets, for in addition to precluding variety and making it impossible to meet specific individual requirements, the utilization of such large sheets does not obviate the need to use retaining dies, which are alone able to provide the required precision for joining together respectively flat and corrugated sheets.

Manifestly, the above-described method is not applicable solely to polyimide sheets but also to any flexible and elastic material which, unassisted, is unable to retain a deformation imparted to it.

What we claim is:

1. A method of manufacturing composite structures having an element shaped to form projections and hollows and more specifically corrugations, using flexible polyimide sheet materials, comprising, in combination, the steps of coating one side of a sheet of such polyimide material with a rigidifying coating consisting essentially of a metal selected from the group consisting of copper, silver, and aluminum, imparting to said sheet a deformation which is retained by said coating, joining this deformed sheet to another sheet, and eliminating said coating after joining the two sheets together by treatment with a substance which is chemically inert with respect to said flexible polyimide materials.

2. Method according to claim 1, wherein the deformation is imparted to the rigidified sheet by rolling.

3. Method according to claim 1, wherein the deformation imparted to the rigidified sheet is retained by supporting said sheet in a die or mold while the rigidified sheet is being joined to the other sheet.

4. Method according to claim 1, wherein the two sheets are joined together by gluing.

5. Method according to claim 1, wherein the two sheets are joined together by welding.

6. Method of manufacturing composite structures from flexible polyimide sheet materials, said structures having at least two elements, one of which elements has a corrugated shape with projections and hollows, said method comprising in combination (a) application of a rigidifying coating onto the surface of one of said elements while in sheet form, said coating consisting essentially of a metallic deposit of copper, (b) imparting to said sheet which is thus coated with copper, a deformation which is retained by said rigidifying coating, (c) joining this deformed sheet to another element in the form of sheet, by means of glue or welding, and (d) eliminating said coating from said sheet by chemical treatment with ferric chloride.

* * * * *